United States Patent [19]

Gregorio

[11] Patent Number: 4,601,346
[45] Date of Patent: Jul. 22, 1986

[54] UNIT CONNECTED TO A TRACTOR FOR RAISING AND LOWERING AN AGRICULTURAL IMPLEMENT

[75] Inventor: Angelo Gregorio, Modena, Italy

[73] Assignee: Fiat Trattori, S.p.A., S.Matteo Modena, Italy

[21] Appl. No.: 650,616

[22] Filed: Sep. 13, 1984

[30] Foreign Application Priority Data

Sep. 30, 1983 [IT] Italy .................................. 3750 A/83

[51] Int. Cl.⁴ ......................................... A01B 63/112
[52] U.S. Cl. ........................................... 172/7; 172/9
[58] Field of Search .................... 172/2, 7, 8, 9, 10, 172/11, 12; 280/446 A, 456 A, 460 A, 461 A

[56] References Cited

U.S. PATENT DOCUMENTS

| 4,260,024 | 4/1981 | Benassi | 172/12 |
| 4,260,025 | 4/1981 | Gregorio | 172/12 |
| 4,289,208 | 9/1981 | Roncarolo | 172/7 |

FOREIGN PATENT DOCUMENTS 1029848 7/1983 U.S.S.R. .................................. 172/7

*Primary Examiner*—Richard T. Stouffer
*Attorney, Agent, or Firm*—Albert L. Jeffers; Anthony Niewyk

[57] ABSTRACT

A unit for raising and lowering an agricultural implement, which unit is connected to a tractor. The unit includes an attachment device (6) for attaching the implement to the tractor, a raising and lowering device (2, 5) for raising and lowering the implement, and a control and regulation device including a linkage and regulation device including a linkage system and an operating lever (27) disposed between the attachment device (6) and the raising and lowering device (2, 5). The unit further includes a flexure bar (7) and is controlled by two control levers (36 and 38) which act on the operating lever (27) to determine the furrow depth and maximum force acceptable by the bar (7).

The principal characteristic of the present invention lies in the fact that it includes a leverage mechanism (61 or 83) which is operable to act on the operating lever (27) for causing the operation of the raising and lowering device (2, 5) and the implement independently of the position of the control levers (36, 38) and independently of the deflection of the flexure bar (7). The leverage mechanism can cause complete raising of the implement and is operable to lower the implement back to the initial position set for the implement by the control levers.

5 Claims, 3 Drawing Figures

UNIT CONNECTED TO A TRACTOR FOR RAISING AND LOWERING AN AGRICULTURAL IMPLEMENT

BACKGROUND OF THE INVENTION

The present invention relates to a unit for raising and lowering an agricultural implement connected to a tractor.

As is known, units of the above indicated type, include an hydraulic raising device and a device for attachment of the implement which serves to connect the implements controlled by the raising device to the tractor. This device includes two lower arms pivoted to a torsion bar supported by the body of the tractor, two vertical link rods which connect the lower arms to the raising device and a strut, the so-called top link, which is attachable to the implement at a central point. The raising device includes a rotatable bar having two lateral arms pivoted at the upper ends of the vertical link rods and an hydraulic distributor operable to actuate, via a control pump, one or more hydraulic cylinders which cause the bar to rotate to raise the implement by means of the lateral arms and the vertical link rods. The unit in question detects the forces on the lower arms of the attachment device of the implement by means of the torsion bar and allows the following modes of operation to be obtained: controlled position, floating position, controlled force, and joint control of force and position. Each of these possibilities is chosen, from time to time, in dependence on the required work, the type of implement and the consistency of the soil. The unit further includes a control and adjustment device by which selection of the above modes of operation is effected. This device has two levers by which the position of the implement with respect to the tractor is controlled. With the first lever, the implement's position is maintained fixed and controlled position working is obtained, while with the second lever the traction force required at the tractor is maintained constant in such a way that the implement automatically varies its position, thus obtaining controlled force working. The other modes of operation are obtained by suitably acting on the said levers.

By means of the said levers, therefore, the most suitable operating conditions for the type of ground to be worked can be chosen in dependence on the type of implement. Now it is apparent that when the tractor arrives at the outer edge of the field it is necessary first to raise the implement by acting on the levers, and subsequently, the tractor has to be turned around, and finally the implement must be lowered again and the two levers put back in the previous positions to allow the continuance of the work in the predetermined operating conditions. The main disadvantage of the units currently utilised lies precisely in the fact that, every time it is necessary to turn the tractor it is necessary to move the levers to raise the implement and then put these levers back into their previous positions. The operations indicated above are, in fact, complex and must be repeated whenever it is necessary to turn the tractor. Moreover, it is apparent that it is very difficult, after having turned the tractor round, to succeed in returning the two levers exactly to the previous positions, and therefore very difficult to obtain exactly the previous operating conditions of the implement.

SUMMARY OF THE INVENTION

The object of the present invention is to provide a unit for raising and lowering an agricultural implement connected to a tractor which will be free from the cited disadvantages, that is to say, which will allow the raising and lowering of the implement without the operation of the levers, but rather by leaving these levers in the position preselected as a function of the established operating conditions.

Further objects and advantages will become apparent in the following description.

According to the present invention there is provided a unit for raising and lowering an agricultural implement connected to a tractor comprising a first attachment device for attaching said implement to the said tractor, a second, raising device operable in use to raise the said implement and a third, control and adjustment, device having a linkage system disposed between the said first device and the said second device and operable to determine the operating conditions of the said implement, characterised by the fact that it includes a fourth device having a first lever which can assume a first position in which, through the action of resilient means, it acts on a second lever of the said third device operable to control the position of a valve of an hydraulic distributor of the said second device, and a second position in which, against the action of the said resilient means, it releases the said second lever; in the said first position the action of the said first lever causes delivery of hydraulic fluid from the said distributor and therefore the raising of the said implement, and in the said second position the said second lever, no longer being subjected to the action of the said first lever, allows the discharge of fluid from the said distributor and therefore the lowering of the said implement, thus returning to the initial operating condition of the said implement which in use, is determined by two control levers of the said third device, which remain set in the same position during the operation of the said fourth device.

BRIEF DESCRIPTION OF THE DRAWINGS

For a better understanding of the present invention, a preferred embodiment will now be described, purely by way of non-limitative example, with reference to the attached drawings, in which.

DETAILED DESCRIPTION OF THE INVENTION

Figure 1:
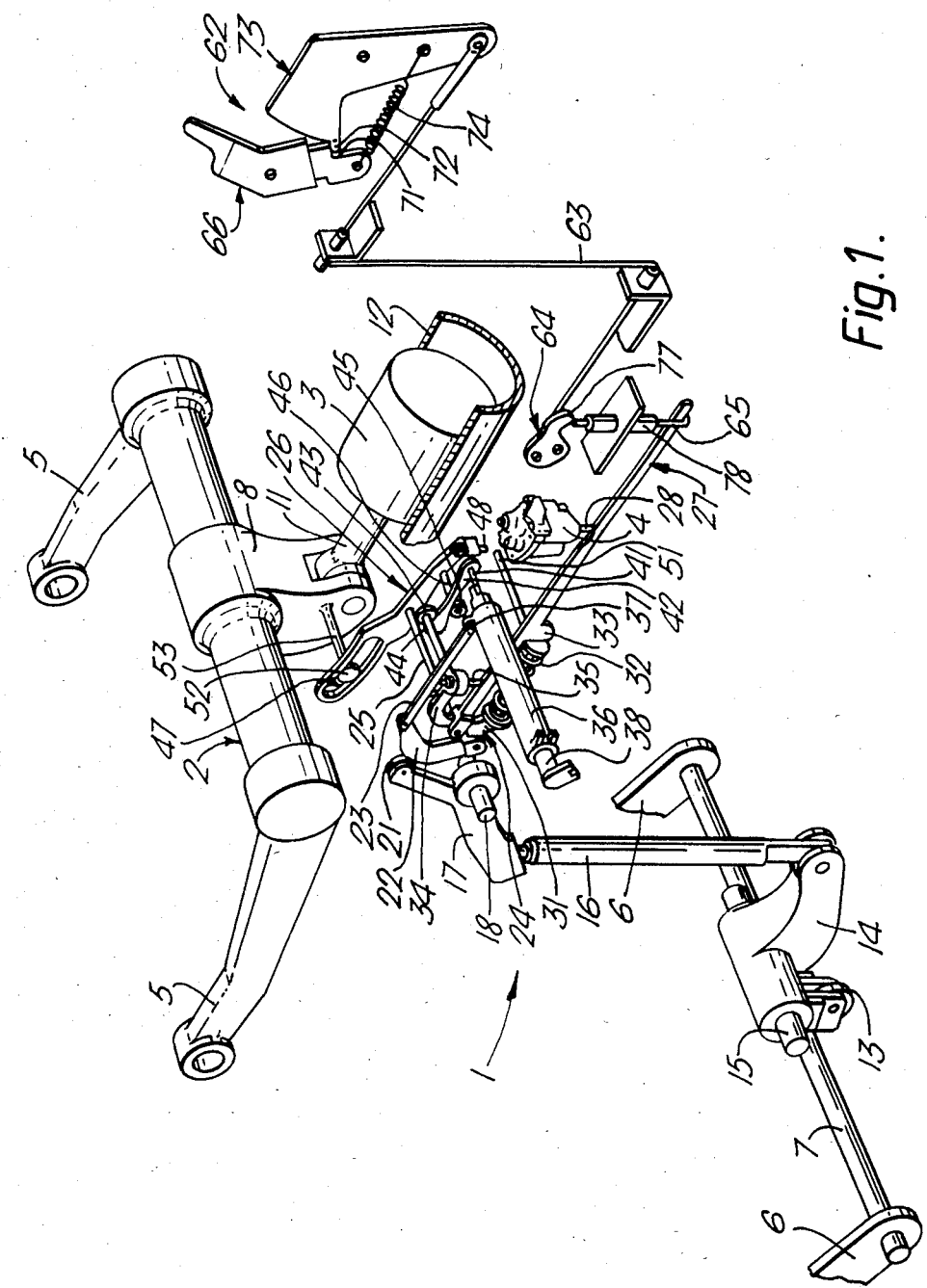
FIG. 1 is a perspective partial view of a unit for raising and lowering an agricultural implement connected to a tractor.

Illustrated in FIG. 1 is a unit, generally indicated 1, for the raising and lowering of an agricultural implement connected to a tractor. The unit 1 includes an hydraulic raising device having a rotatable bar 2, an hydraulic piston 3, a control pump not illustrated, and an hydraulic distributor 4. From the ends of the bar 2 extend two lateral arms 5 to the ends of which are pivoted the upper ends of two vertical link rods (not illustrated) which have lower ends pivoted to intermediate portions of two lower arms 6 each having a first end pivoted to the body of the implement and a second end pivoted to a torsion bar 7 supported by the body of the tractor. The bar 2 has a central projection 8 to one end of which is pivoted a rod 11 extending from the piston 3 which can slide within a hollow cylinder 12. The axial translation of the piston 3 is caused by oil sent under pressure from the said control pump to the interior of the cylinder 12. In use, the oil under pressure causes the bar 2 to rotate in a clockwise sense causing raising of the implement by means of the vertical link rods, whilst upon discharging the oil from the cylinder 12 the bar 2 turns in an anti-clockwise sense under the weight of the implement.

The unit 1 further includes a drawing device constituted by the vertical link rods, lower arms 6 and a strut (not illustrated) which connects a central point of the implement to the body of the tractor. The unit 1 is provided with a control and adjustment device which allows various operating conditions to be obtained according to the implement used and the working requirements. The modes of operation comprise; operation at controlled position, in which the implement is maintained in a constant position with respect to the tractor; operation with controlled force, in which the position of the implement automatically varies in such a way as to maintain constant the traction force required from the tractor; floating operation, in which the implement is free to displace vertically; and combined controlled force and position operation, in which the implement can vary its position in dependence on the traction force, only above a predetermined maximum depth.

This control and adjustment device includes a linkage assembly disposed between the torsion bar 7 and the hydraulic raising device. The adjustment of the linkage assembly is determined by the position of two levers along respective guides, normally situated within the driver's cab of the tractor. The levers in use are called, respectively, the force control lever and the position control lever. Close to the central part of the torsion bar 7 there is positioned a rotatable wheel 13 which can cooperate with the bar 7 when this deflects in use. The wheel 13 is supported by a lever 14 having a first end pivoted on a pin 15 supported by a portion of the chassis of the tractor and a second end pivoted to a lower end of a vertical rod 16. This latter has an upper end pivoted to a first end of a lever 17 which is able to rotate about a pivot 18 passing through its central portion and supported by a tractor chassis. The lever 17 has a second end supporting a rotatable wheel 21 which can cooperate, in use, with an intermediate portion of a lever 22 having an upper end pivoted to a first end of a link 23 and a lower end pivoted to a central portion of a substantially U-shaped lever 24. The lever 24 can turn about a first end of a fixed pin 25 which has a second end rigidly connected to a central portion of a lever 26. On the said first end of the pin 25 there is also pivoted a first end of a lever 27 having an upper portion which can cooperate with a valve 28 of the hydraulic distributor 4. the lever 24 has a lower arm 31 cooperating by means of a resilient strut 32 with a projection 33 extending downwardly from an intermediate portion of the lever 27. The lever 24 further has an upper arm 34, the free end of which supports an adjustment screw 35 extending downwardly to cooperate with an intermediate portion of the lever 27. The control and adjustment device further includes a hollow rotatable shaft 36 connected by means of link rods to the said force control lever. A second end of the link 23 is pivoted to an outer projection 37 of the shaft 36. In the interior of the shaft 36 there is housed a rotatable pin 38 connected by link rods to the position control lever. From the pin 38 extends a cylindrical axial projection 41 outside the shaft 36 supporting a spacer link 42. In particular, the projection 41 is rigidly connected to the link 42 close to one end of this latter. The link 42 is suitably shaped so as to have respective upper and lower concavities. On the upper concavity acts a rotatable wheel 43, supported by a pin 44 fixed to the free end of the upper arm 34 of the lever 24. On the lower concavity of the link 42 acts a rotatable wheel 45 supported by a pin 46 extending from a central portion of the lever 26. This latter has a first end in which is formed a through slot 47 and a second end supporting an adjustment screw 48 which can cooperate, in use, with a projection 51 extending from a central portion of the lever 27. A rotatable wheel 52 supported by a pin 53 extending from the projection 8 of the bar 2 acts on the inside of the slot 47.

The description will now be limited to the operation of the unit 1 only according to the two most important modes of operation, that is to say the controlled position mode and the controlled force mode. All this before introducing the principle characteristics of the present invention, that is to say, that of comprising a member capable of acting on the lever 27 for raising and lowering of the implement without interacting with the position control lever and the force control lever. It is thus necessary, even though the unit 1 described up to now is already known, to explain its function in that the action which the said member causes is thereby more comprehensible.

The mode of operation with controlled position is achieved by displacing the position control lever backwards. This displacement causes an anti-clockwise rotation of the pin 38 and therefore an axial displacement of the link 42 situated between the wheels 43 and 45. Since the wheel 45 is initially stationary, in that it is connected to the lever 26, the link 42 reacts on it and presses the roller 43 upwards, causing the levers 24 and 27 to turn in an anti-clockwise direction. The anti-clockwise rotation of the lever 27 actuates the valve 28 which enables the distributor 4 to control the supply of oil under pressure to the interior of the main cylinder 12. The action of the piston 3 causes rotation in a clockwise sense of the bar 2 and thus starts raising the implement. The arms 5 raise the implement until the lever 26, turning in a clockwise sense under the action of the wheel 52, lowers the wheel 45, thus disengaging the wheel 43 and therefore allowing the clockwise rotation of the lever 27 under the action of the valve 28 thrust downwardly by the action of an internal spring within the distributor 4. This latter returns to neutral and this allows neither supply nor discharge of the oil from the cylinder 12. Consequently, the arms 5 come to rest. The maximum height of the arms 5 is limited, independently of the position control lever, by the adjustment screw 48 which, coming into contact with the projection 51 firmly secured to the lever 27, carries the distributor 4 into neutral position before the piston 3 reaches the mechanical end of its stroke. Similar movements in the opposite direction take place in the event of forward displacement of the position control lever to lower the implement.

The conditions of controlled force operation are achieved by displacing the force control lever on the sector of its associated guide with respect to the desired working depth. If, because of a thicker consistency of the ground, the force applied by the implement onto the lower arm 6 tends to increase, this causes deflection of the bar 7 which, by acting against the wheel 13, causes rotation in an anticlockwise sense of the lever 14 which transmits movement to the lever 17. This latter turns in a clockwise sense and by means of the wheel 21 presses on the lever 22 which, being pivoted to the lever 24, and connected by means of the link 23 to the shaft 36, currently stationary, causes in turn, rotation in an anticlockwise sense of the lever 24 and therefore upward displacement of the lever 27. This latter displacement puts the distributor 4 in its delivery position and therefore causes raising of the implement. The arms 5 rise until the consequent reduction in the force on the lower arms 6 reduces the deflection of the bar 7 and causes rotation in the opposite sense of the lever 14 allowing the downward movement of the lever 27 thrust by the inner spring of the distributor 4 and acting on the valve 28. The distributor 4 is now in neutral position. Once the obstacle has been overcome, the further reduction of force on the arms 6 also further reduces the deflection of the bar 7 and causes upward rotation of the lever 27 therefore putting the distributor 4 in its delivery position. The arms 5 rise until the consequent reduction of the force on the arms 6 causes the reversal of the wheel 21 and thus return of the distributor 4 to the neutral position. When it is desired to increase the value of the force beyond that which causes the raising of the implement, it is necessary to displace the force control lever forwardly and activate an operation with a reverse movement of the various levers. To obtain the other operating conditions it is necessary to act on both the position control and force control levers, displacing both these levers forwardly to obtain the floating position mode of operation and displacing the position control lever forwardly and the force control lever rearwardly to obtain the mixed force and position control mode of operation.

Figure 2:
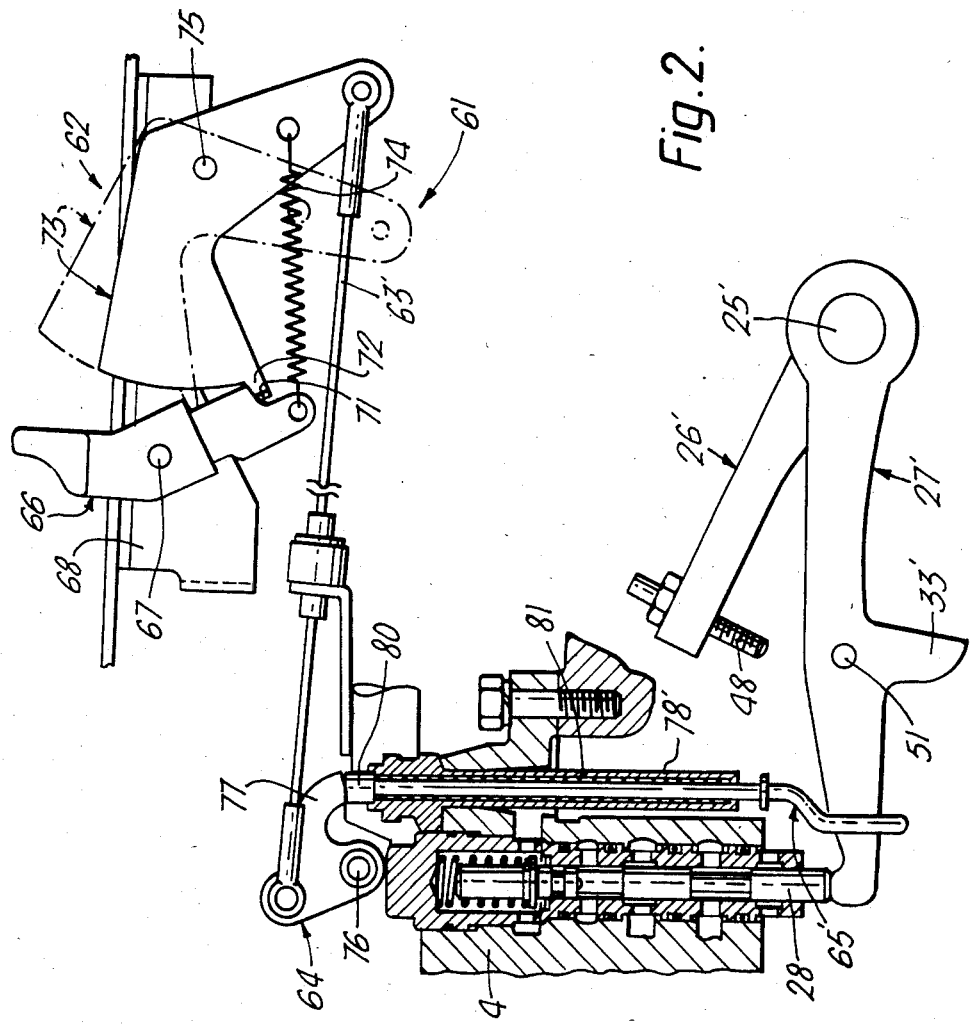
FIG. 2 is a partial side view partially in section of a detail of the unit of FIG. 1.

As illustrated in FIGS. 1 and 2, a mechanical device, generally indicated 61, is provided which can cause complete raising of the equipment connected to the arms 6 and is operable to lower it back to the initial position set by means of the force control and position control levers. By means of the device 61 the raising and lowering of the equipment is thus obtained without the use of the control levers which therefore remain in their predetermined positions. In FIGS. 1 and 2 the device 61 is constituted by the same elements but is fitted on the lever 27 in a different manner. The device 61 has a release mechanism 62 which in use is located close to the operator's seat or in any easily accessible suitable position as long as it remains protected from possible accidental, and therfore unwanted, operation. The device 61 further includes a rod 63 operable to connect the release mechanism 62 to a lever 64 which acts on an axially slidable pin 65 which acts on the lever 27 for control of the valve 28 of the distributor 4.

The release mechanism 62 has a first lever 66 centrally pivoted on a pin 67 supported by a portion 68 of the tractor chassis. This lever 66 has a first, upper end on which the operator acts to actuate the release mechanism and a second, lower end in which is formed a lateral re-entrant portion 71 which can be engaged by a projection 72 of a second lever 73 having an upper portion on which, in use, the operator acts and from which the projection 72 extends. The lever 73 is pivoted at its intermediate portion about a pin 75 supported by the tractor chassis portion 68. To the lower end of the lever 73 is fixed one end of the rod 63 the other end of which is fixed to an upper end of the lever 64 having a lower end pivoted to a pin 76, supported by a fixed portion of the tractor chassis. From the lever 64 extends a projection 77 shaped substantially as an inverted L and operable to act on the pin 65. The lower end of the pin 65 is U-shape and is internally engaged by a portion of the lever 27 close to the end of this latter which cooperates with the valve 28 with reference to FIG. 2, or by a portion of the lever 27 extending beyond that cooperating with the valve 28 with reference to FIG. 1.

As illustrated in FIG. 2, the pin 65' is housed within a sleeve 78' and has an upper end projecting from the sleeve 78' and cooperating with the projection 77 of the lever 64 and the said lower end which hooks onto a portion of the lever 27'. Within the sleeve 78' there is a spring 81 which is preloaded and presses the pin 65' upwardly. In fact, the spring 81 has a lower end cooperating with the lower portion of the sleeve 78' and an upper end cooperating with an annular projection 80 of the pin 65'. In the position illustrated in FIG. 2 the device 61 causes lowering of the implement in that the position of the lever 73 causes, by means of the rod 63', rotation in a clockwise sense of the lever 64 and therefore causes the projection 77 to press on the upper end of the pin 65'. This pressure is able to overcome the action of the spring 81 and therefore to cause the pin 65' to be displaced downwardly. This downward displacement permits the valve 28 to move to a neutral position and to a discharge position under the action of the internal spring of the distributor 4 thus causing lowering of the implement. The action of the spring 81 is able to cause the pin 65' to return upwardly and to make the lever 64 turn whenever the device 61 has returned to the above-described position.

By turning the lever 66 in a clockwise direction against the action of a spring 74 which connects a lower portion of the lever 73 with the lower end of the lever 66, the release of the projection 72 from the re-entrant portion 71 is caused and therefore the lever 73 rotates in a clockwise sense under the action of the spring 81. This rotation causes rotation in an anti-clockwise sense of the lever 64 and displacement of the pin 65' upwardly which carries with it the lever 27' which, by acting on the valve 28, puts the distributor 4 in the delivery position and therefore causes raising of the implement in the manner described above. In fact, the maximum height of the arms 5, as already indicated, is limited by the adjustment screw 48 which, by coming into contact with the projection 51 puts the distributor 4 in its neutral position. It is to be noted, moreover, that the device 61 illustrated in FIG. 1 is disposed with respect to the lever 27' in a mirror-image position with respect to the device 61 illustrated in FIG. 2, as well as the differences already indicated of the point of application of the pin 65' on the lever 27'.

Figure 3:
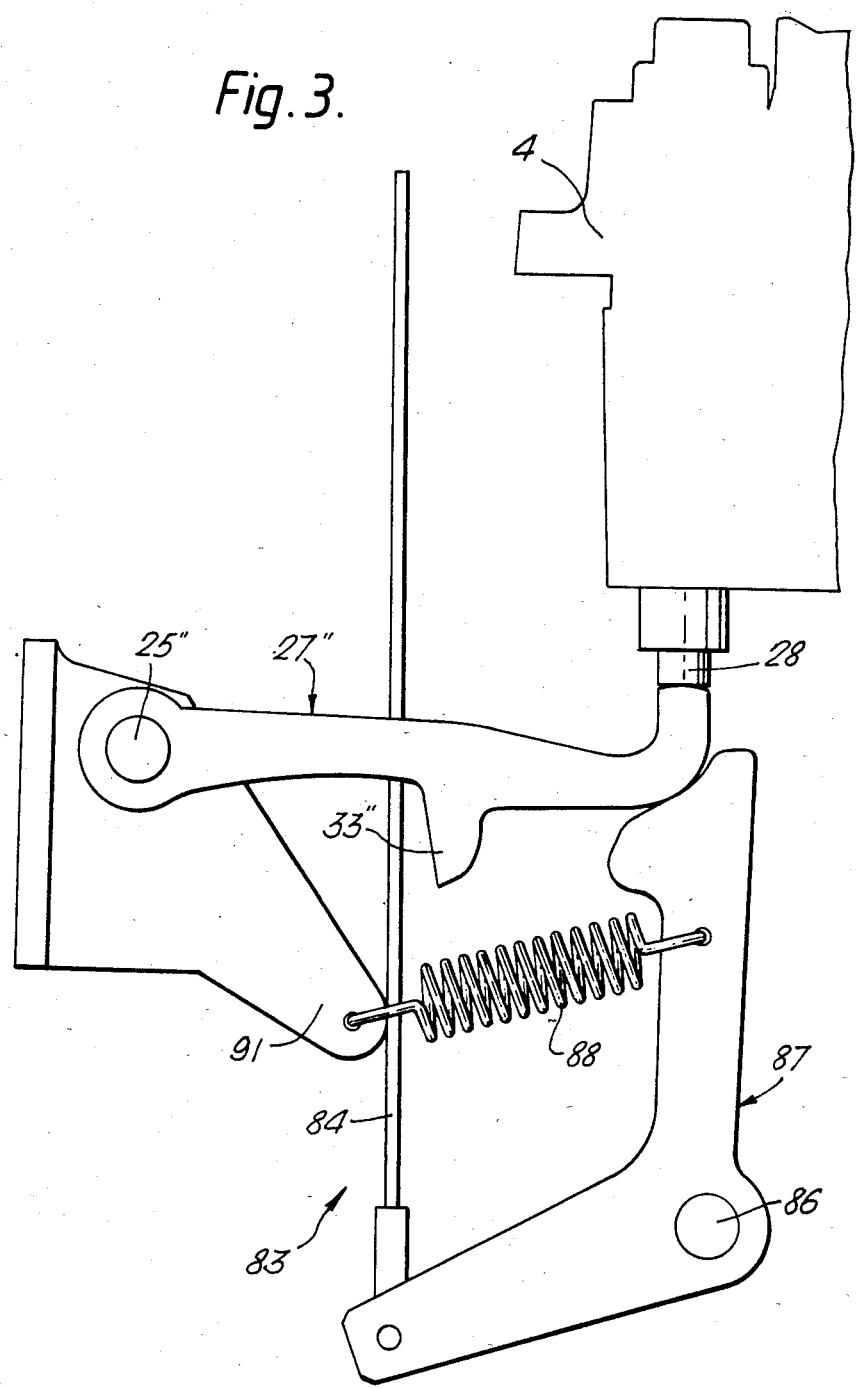
FIG. 3 is a partial side view of various parts of the detail of FIG. 2 in a different embodiment.

As illustrated in FIG. 3, the reference numeral 83 generally indicates a device similar to the device 61. The device 83 includes a release mechanism similar to the release mechanism 62, a rod 84 which connects the release mechanism to a first end of a lever 87 pivoted at its central portion on a fixed pin 86 and having a second end which cooperates with a lower portion of the lever 27" opposite the portion of this latter cooperating with the valve 28 of the distributor 4. The device 83 further includes a spring 88 having a first end fixed to a portion close to the second end of the lever 87 and a second end fixed to a fixed portion 91 of the tractor chassis. The spring 88 is preloaded and acts on the lever 87 making this latter turn in an anticlockwise sense about the pin 86. By means of the lever 73 it is possible to pull the rod 84 and therefore cause rotation in a clockwise sense of the lever 87 which separates its said second end from the lever 27" against the action of the spring 88. The inner spring of the distributor 4 presses the valve 28 downwardly and is no longer obstructed by the lever 87 and permits the distributor 4 to move to the discharge position causing lowering of the implement down to the position preselected by means of the force and position control levers. To obtain raising of the implement it is necessary that the tension on the rod 84 is nullified via the lever 66 in such a way that it no longer impedes the action of the spring 88 which biases the lever 87 to cooperate at its upper end with the lever 27" by pressing this latter upwardly for the purpose of putting the distributor 4 in its delivery position and obtaining raising of the implement as far as the maximum position established by the adjustment screw 48 which returns the distributor 4 to neutral.

From what has been described above, the advantages obtained by the embodiment of the present invention will be apparent.

In particular, in certain conditions, that is to say when it is necessary to raise the implement only in order to be able to turn the tractor and subsequently return to the predetermined conditions of use, by means of the device 61 or 83, the raising and subsequent lowering is obtained with simple operation without acting on the force and position control levers. Therefore, as well as obtaining a greater simplicity in the raising and lowering operations, the conditions of use preselected in dependence on the consistency of the ground and the type of working are always maintained. Moreover, the insertion of the device 61 or 83, into the unit 1 does not involve modifications and therefore additional production costs of the unit 1 itself.

Finally, the device 61 or 83 is simple to manufacture and therefore of low cost and the release mechanism 62 is easily accessible to the operator. Moreover, it is to be noted that the operation of the spring 81 or the spring 88 is not only as previously described. In fact, these springs 81 or 88 also serve to cause raising of the implement in the event of breakage of the device 61 or 83. There is therefore the certainty that, in the event of possible mishandling or breakage of the device 61 or 83, the implement will be raised.

Finally, it is clear that the unit 1 described and illustrated herein, can be modified and varied without by this departing from the scope of the present invention. In particular, the release mechanism of the device 61 or 83 can be formed differently from the release mechanism 62, and likewise the lever which acts on the lever 27, the principle remaining the same of assuming a first position in which the raising of the lever 27 by the action of the spring 81 or 88 is caused, and a second position in which, against the action of resilient means such as the spring 81 or 88, the lever 27 is released.

I claim:

1. A unit for raising or lowering an agricultural implement, said unit connected to a tractor and comprising a means for attaching an implement to a tractor, a means for raising the said implement including a hydraulic distributor (4) having a valve (28), a means for controlling and adjusting the implement including two control levers positionable to selected positions and a linkage system including an operating lever disposed between the said attaching means and the said raising means and operable to determine the operating conditions of the said implement, characterised by the fact that the controlling means includes a means (61 or 83) for selectively raising and lowering said implement and having a first override lever (64,87) and a resilient means (81, 88) for causing said first lever to assume a first position wherein said first override lever acts on said operating lever (27) of the said controlling means to control the position of said valve (28) of said hydraulic distributor (4) of the said raising means, and a second position wherein said first override lever acts against the biasing force of the said resilient means (81,88), and releases the said operating lever (27); said first override lever (64,87), in said first position, causing the said distributor (4) to assume its supply position and thereby causing the said implement to be raised, said operating lever (27) being unaffected by the operation of the said first override lever (64,87) when said first override lever is in its second position and thereby permitting the said distributor (4) to move to its discharge position and causing the said implement to be lowered and to return to its initial operating condition, said initial operating condition of said implement being determined by said two control levers of the said controlling means which remain positioned in their selected positions during the operation of the said selective raising and lowering means (61,83).

2. A unit according to claim 1, characterised by the fact that the said selective raising and lowering means (61,83) includes a release shutter (62) which can assume a first position in which said release shutter (62) controls the action of the said first override lever (64, 87) by way of a link rod (63, 84) to release the said operating lever (27) against the biasing force of the said resilient means (81, 88) and a second position in which said shutter (62) does not oppose the biasing force of the said resilient means (81,88) which thus acts on the said operating lever (27) to cause the said distributor (4) to assume its supply position.

3. A unit according to claim 2, characterised by the fact that the said first override lever (64) has a lower end pivotably mounted on a first fixed pin (76), and an upper end secured to one end of the said link rod (63'), a projection (77) of said first override lever (64) cooperating, in the said first position of the said first override lever (64), with the upper end of a second pin (65'), said second pin (65') having a substantially U-shaped lower end for engaging a portion of the said operating lever (27'); a central portion of the said second pin (65') being disposed in a sleeve (78'), said sleeve (78') also housing said resilient means (81), said resilient means 81 operable to act on the said second pin (65') to urge said second pin (65') axially upwardly.

4. A unit according to claim 2, characterised by the fact that the said first override lever (87) is pivoted at its central portion on a third fixed pin (86) and has a first end connected to one end of the said link rod (84) and a second end which can cooperate in the said first position of the said first override lever (87) with a lower portion of the said operating lever (27'), to cause an upward thrust on the said operating lever (27'); the said resilient means including a spring (88), a first end of said spring (88) being secured to a fixed portion of the chassis of said tractor and a second end of said spring (88) being secured to a portion of the said first override lever (87) close to the said second end thereof.

5. A unit according to claim 3, characterised by the fact that the said release mechanism (62) includes an actuating lever (73) with a second projection (72) and a release lever (66) having a central portion pivoted on a fourth fixed pin (67) on an upper end of which, in use, the operator acts to cause clockwise rotation of the said release lever (66), and a lower end in which is formed a re-entrant portion (71) which is engageable with said second projection (72) of said actuating lever (73), said actuating lever (73) being pivoted at its central portion on a fifth fixed pin (75) and having a lower end fixed to one end of the said link rod (63, 84); the said actuating lever (73) having a first position determinable by operator pressure when exerted on said actuating lever (73) by the operator in which the said second projection (72) engages the said re-entrant portion (71) and by which the release of the said operating lever (27) is caused by the action of the said first override lever (64,87) against the said resilient means (81, 88) and a second position in which the said second projection (72) is disengaged from the said re-entrant portion (71) because of the clockwise rotation of the said release lever (66) when to the operator overcomes the reaction of the said third spring (74) and in which, because of this disengagement, the said actuating lever (73) is rotated clockwise by the action of the said resilient means (81, 88) and permits the said first override lever (64, 87) to assume its said first position to move the said distributor (4) to its supply position.

* * * * *

UNITED STATES PATENT AND TRADEMARK OFFICE
CERTIFICATE OF CORRECTION

PATENT NO. : 4,601,346

DATED : July 22, 1986

INVENTOR(S) : Angelo Gregorio

It is certified that error appears in the above-identified patent and that said Letters Patent is hereby corrected as shown below:

Title page:

In the Foreign Application Priority Data, change "3750 A/83" to --3570 A/83--.

Signed and Sealed this

Tenth Day of March, 1987

*Attest:*

DONALD J. QUIGG

*Attesting Officer*  Commissioner of Patents and Trademarks